(12) United States Patent
MacKinnon et al.

(10) Patent No.: US 7,601,759 B2
(45) Date of Patent: Oct. 13, 2009

(54) WATER INSOLUBLE ADDITIVE FOR IMPROVING CONDUCTIVITY OF AN ION EXCHANGE MEMBRANE

(75) Inventors: Sean M. MacKinnon, Burnaby (CA); Timothy J. Peckham, Richmond (CA); Charles Stone, West Vancouver (CA)

(73) Assignee: BDF IP Holdings Ltd., Vancouver, BC (CA)

( * ) Notice: Subject to any disclaimer, the term of this patent is extended or adjusted under 35 U.S.C. 154(b) by 729 days.

(21) Appl. No.: 10/962,184

(22) Filed: Oct. 8, 2004

(65) Prior Publication Data

US 2005/0112439 A1  May 26, 2005

Related U.S. Application Data

(60) Provisional application No. 60/510,664, filed on Oct. 10, 2003.

(51) Int. Cl.
C08J 5/22 (2006.01)
H01M 8/10 (2006.01)

(52) U.S. Cl. .......................................... 521/27; 429/33
(58) Field of Classification Search ................... 429/33; 521/27
See application file for complete search history.

(56) References Cited

U.S. PATENT DOCUMENTS

| | | | |
|---|---|---|---|
| 4,634,530 A | 1/1987 | Kuder et al. ........... 210/500.23 |
| 4,933,397 A | 6/1990 | Sansone et al. ............. 525/435 |
| 5,525,436 A | 6/1996 | Savinell et al. ................ 429/30 |
| 5,599,639 A | 2/1997 | Sansone et al. ............... 429/33 |
| 5,945,233 A | 8/1999 | Onorato et al. ............... 429/33 |
| 6,059,943 A * | 5/2000 | Murphy et al. ............... 204/296 |
| 6,124,060 A | 9/2000 | Akita et al. ................... 429/307 |
| 6,156,184 A | 12/2000 | Antoncucci et al. ......... 205/334 |
| 6,187,231 B1 | 2/2001 | Sansone et al. ............... 264/41 |
| 6,680,138 B1 | 1/2004 | Honma et al. ................. 429/33 |
| 7,064,226 B2 * | 6/2006 | Sullivan et al. ............. 556/404 |
| 2002/0058173 A1 | 5/2002 | Alberti et al. ................. 429/30 |
| 2002/0068207 A1 | 6/2002 | Baldauf et al. ................ 429/26 |
| 2003/0003340 A1 | 1/2003 | Honma et al. ................. 429/33 |
| 2003/0032739 A1* | 2/2003 | Kerres et al. ................. 525/535 |
| 2004/0248013 A1 | 12/2004 | Wariishi et al. ............. 429/313 |
| 2005/0113547 A1 | 5/2005 | Li et al. ........................ 528/30 |

FOREIGN PATENT DOCUMENTS

| | | | |
|---|---|---|---|
| EP | 0 273 756 A2 | 7/1988 |
| JP | 2001-011219 A | 1/2001 |
| JP | 2002/080214 | 3/2002 |
| JP | 2002-324558 | 11/2002 |
| WO | WO 02/055587 A1 | 7/2002 |
| WO | WO 02055587 A1 * | 7/2002 |
| WO | WO 03/050169 A2 | 6/2003 |
| WO | WO 03/083985 A2 | 10/2003 |
| WO | WO 2004/067611 A1 | 8/2004 |

OTHER PUBLICATIONS

Jurado-Gonzalez, M., et al., "Allylic and Benzylic Oxidation Using Cobalt(II) Alkyl Phosphonate Modified Silica," *Tetrahedron Letters*, 44:4283-4286, 2003.
Adjemian, K., et al., "Silicon oxide Nafion Composite Membranes for Proton Exchange Membrane Fuel Cell Operation at 80-140 C, " *Journal of the Electrochemical Society* 149(3):A256-A261, 2002.
Aliev, A., et al., "Porous Silica and Polysilsesquioxane with Covalently Linked Phosphates and Phosphonic Acids," *Journal of Mater. Chem.* 10:2758-2764, 2000.
Apichatachutapan, W., et al.,"Asymmetric Nafion/(Zirconium Oxide) Hybrid Membranes Via in Situ Sol-gel Chemistry," *Journal of Applied Polymer Science* 62:417-426, 1996.
Deng, Q., et al., "Nafion/(SiO2, ORMOSIL, and Dimethylsiloxane) Hybrids via in Situ sol-gel Reactions: Characterization of Fundamental Properties," *Journal of Applied Polymer Science* 68: 747-763, 1998.
Matsuda, A., et al., "Proton Conductivity and Structure of Phosphosilicate Gels Derived from Tetraethoxysilane and Phosphoric Acid or Triethylphosphate," *Solid State Ionics* 139(1&2):113-119, 2001.
Nagai, M., et al., "Inorganic-organic Composite Protonic Conductors Comprising Silicophosphate Glass and Ion Exchange Resin" *Solid State Ionics* 136/137:249-254, 2000.
Nogani, M., et al., "A Sol-gel Derived Glass as a Fuel Cell Electrolyte," *Advanced Materials* 12(18):1370-1372, 2000.
Wainright, J. S., et al., "Acid-doped Polybenzimidazoles: A New Polymer Electrolyte," *Journal of the Electrochemical Society* 142(7):L121-L123, 1995.

\* cited by examiner

*Primary Examiner*—David Wu
*Assistant Examiner*—Michael M Bernshteyn
(74) *Attorney, Agent, or Firm*—Seed IP Law Group PLLC

(57) ABSTRACT

A water insoluble additive for improving the performance of an ion-exchange membrane, such as in the context of the high temperature operation of electrochemical fuel cells. The insoluble additive comprises a metal oxide cross-linked matrix having acid groups covalently attached to the matrix through linkers. In one embodiment, the metal is silicon and the cross-linked matrix is a siloxane cross-linked matrix containing silicon atoms cross-linked by multiple disiloxy bonds and having acid groups covalently attached to the silicon atoms through alkanediyl linkers.

12 Claims, 1 Drawing Sheet

WATER INSOLUBLE ADDITIVE FOR IMPROVING CONDUCTIVITY OF AN ION EXCHANGE MEMBRANE

CROSS-REFERENCE TO RELATED APPLICATION

This application claims the benefit of U.S. Provisional Patent Application No. 60/510,664 filed Oct. 10, 2003, where this provisional application is incorporated herein by reference in its entirety.

BACKGROUND OF THE INVENTION

1. Field of the Invention

This invention generally relates to a water insoluble additive for improving the performance of an ion exchange membrane, particularly in the context of high temperature operation of electrochemical fuel cells.

2. Description of the Related Art

Electrochemical fuel cells convert reactants, namely fuel and oxidant streams, to generate electric power and reaction products. Electrochemical fuel cells generally employ an electrolyte disposed between two electrodes, a cathode and an anode. An electrocatalyst induces the desired electrochemical reactions at the electrodes. In addition to the electrocatalyst, the electrodes may also contain an electrically conductive substrate upon which the electrocatalyst is deposited. The electrocatalyst may be a metal black (such as a substantially pure, unsupported finely divided metal or metal powder) an alloy, or a supported metal catalyst (such as platinum on carbon particles).

One type of electrochemical fuel cell is a proton exchange membrane (PEM) fuel cell. Such fuel cells employ a membrane electrode assembly (MEA) comprising an ion-exchange membrane as the electrolyte disposed between the two electrodes. Ion-exchange membranes that have received considerable attention are those prepared from fluoropolymers and which contain pendant sulfonic acid functional groups functional groups. A representative polymer in this regard can be obtained from DuPont Inc. under the trade name Nafion®.

A broad range of reactants can be used in electrochemical fuel cells. For example, the fuel stream may be substantially pure hydrogen gas, a gaseous hydrogen containing reformate stream, or methanol in a direct methanol fuel cell. The oxidant may be substantially pure oxygen or a dilute oxygen stream such as air.

The electrochemical oxidation that occurs at the anode electrocatalyst of a PEM fuel cell results in the generation of cationic species, typically protons. These protons must then cross the electrolyte to the cathode electrocatalyst where reaction with the oxidant generates water, thereby completing the electrochemistry. Typically, transport of protons across the ion-exchange membrane is assisted by water molecules. Thus, humidification of the ion-exchange membrane has been found to improve conductivity and hence fuel cell performance. In the case of Nafion®, high conductivity is observed in the presence of water due to the movement of protons between sulfonate clusters. In the absence of water, such free movement of protons is restricted and conductivity of the electrolyte is significantly decreased.

Traditionally, operation of PEM fuel cells have been limited to operational temperatures below 100° C. to limit dehydration of the ion-exchange membrane. At temperatures above 100° C., the vapor pressure of water increases rapidly, resulting in dehydration of the ion-exchange membrane and operational difficulties. For example, one technique for operating electrochemical fuel cells at temperature above 100° C. is to employ a pressurized humidification system for maintaining hydration of the electrolyte. Other techniques have involved attempts to improve fuel cell performance under low humidity conditions (which provides benefits at operational temperatures both above and below 100° C.).

One technique for improving fuel cell performance under low humidity conditions involves acid doping of the ion-exchange membrane with, for example, phosphoric acid. Such acid molecules act as the proton-conducting medium and are held in the membrane by non-covalent, acid-base ionic interactions. For example, phosphoric acid doping of polybenzimidazole (PBI) resin has shown some promise as an electrolyte for high temperature fuel cells. The phosphoric acid molecules are associated with the basic imidazole nitrogen atom through hydrogen bonding (see Wainright et al., *J. Electrochem. Soc.* 142(7):L121-123, 1995; U.S. Pat. No. 5,525,436). However, for such compositions, the operational temperature of the fuel cell must be maintained above 100° C. If the fuel cell falls below this temperature, condensed water within the fuel cell washes out the acid molecules, thus resulting in decreased performance (see, e.g., U.S. Published Application No. U.S.2002/0068207).

The limitations associated with prior acid doping techniques have lead to further research in this area in an effort to better retain the acid molecules within the acid-doped membrane. For example, one technique involves doping of phosphoric acid molecules into a porous PBI membrane prepared through coagulation with subsequent drying, and then collapsing the membrane to physically trap the acid molecules (see U.S. Pat. Nos. 5,599,639 and 6,187,231). Another technique involves soaking finally divided PBI polymer in an acid that result in dissolution of the polymer and formation of a paste or gel that can then be applied to a polymer fabric or used directly as the electrolyte in a fuel cell (U.S. Pat. No. 5,945,233). While these techniques report improvements in retention of the doped acid, the amount of bound acid molecules per monomer repeat unit of the polymer does not change, and leaching of the unbound acid inevitably results in a decrease in performance of the fuel cell.

To reduce leaching of acid-doped membranes, attempts have been made to dope with organic sulfonic or phosphoric acids (see U.S. Pat. No. 6,124,060), or by covalently bonding organic sulfonic or phosphoric acids through N-alkyl or N-aryl linkages (see U.S. Pat. No. 4,933,397). Similarly, U.S. Pat. No. 4,634,530 is directed to the formation of a covalently bonded sulfonated PBI membrane by contacting the PBI membrane with a sulfonating agent, followed by heating the same for a period of time sufficient to convert the ionic bonds formed in the contacting step to covalent bonds.

Accordingly, there remains a need in the art for ion-exchange membranes for use in high temperature fuel cells. Furthermore, during start up, shut down, or low load conditions, such high temperature fuel cells may operate for some period of time at lower temperatures, such as lower than 100° C. Thus, ion-exchange membranes are needed that will perform to acceptable degrees over a wide range of operational temperatures. The present invention fulfils these needs and provides further advantages.

BRIEF SUMMARY OF THE INVENTION

In brief, the present invention provides a water insoluble additive for improving the performance of an ion-exchange membrane, especially in the context of high temperature operation of electrochemical fuel cells.

In one embodiment, the water insoluble additive comprises a metal oxide cross-linked matrix having acid groups covalently attached to the matrix through linkers. More specifically, the metal may be silicon, titanium, zirconium, germanium, aluminum, tin, or combinations thereof. In a more particular embodiment, the metal is silicon and the cross-linked matrix is a siloxane cross-linked matrix containing silicon atoms cross-linked by multiple disiloxy bonds (Si—O—Si) and having acid groups (—PO(OH)$_2$) covalently attached to the silicon atoms through linkers (L). For example, the linker may be an alkanediyl group such as —(CH$_2$)$_3$—.

In another embodiment, an ion-exchange membrane loaded within the interior of the membrane with the water insoluble additive is disclosed. For example, the water insoluble additive may be homogenously dispersed throughout the ion-exchange membrane.

In other embodiments, a membrane electrode assembly (MEA), fuel cell, fuel cell stack and/or products incorporating the same are also disclosed.

In still further embodiments, methods for making an ion-exchange membrane having improved conductivity is disclosed. Such methods comprise the step of loading an ion-exchange membrane with the water insoluble additive of this invention. Such loading may be accomplished by casting the ion-exchange membrane with the additive and/or by in situ synthesis of the water insoluble additive within the ion-exchange membrane.

These and other aspects of the invention will be evident upon reference to the following detailed description.

DETAILED DESCRIPTION OF THE INVENTION

Figure 1:
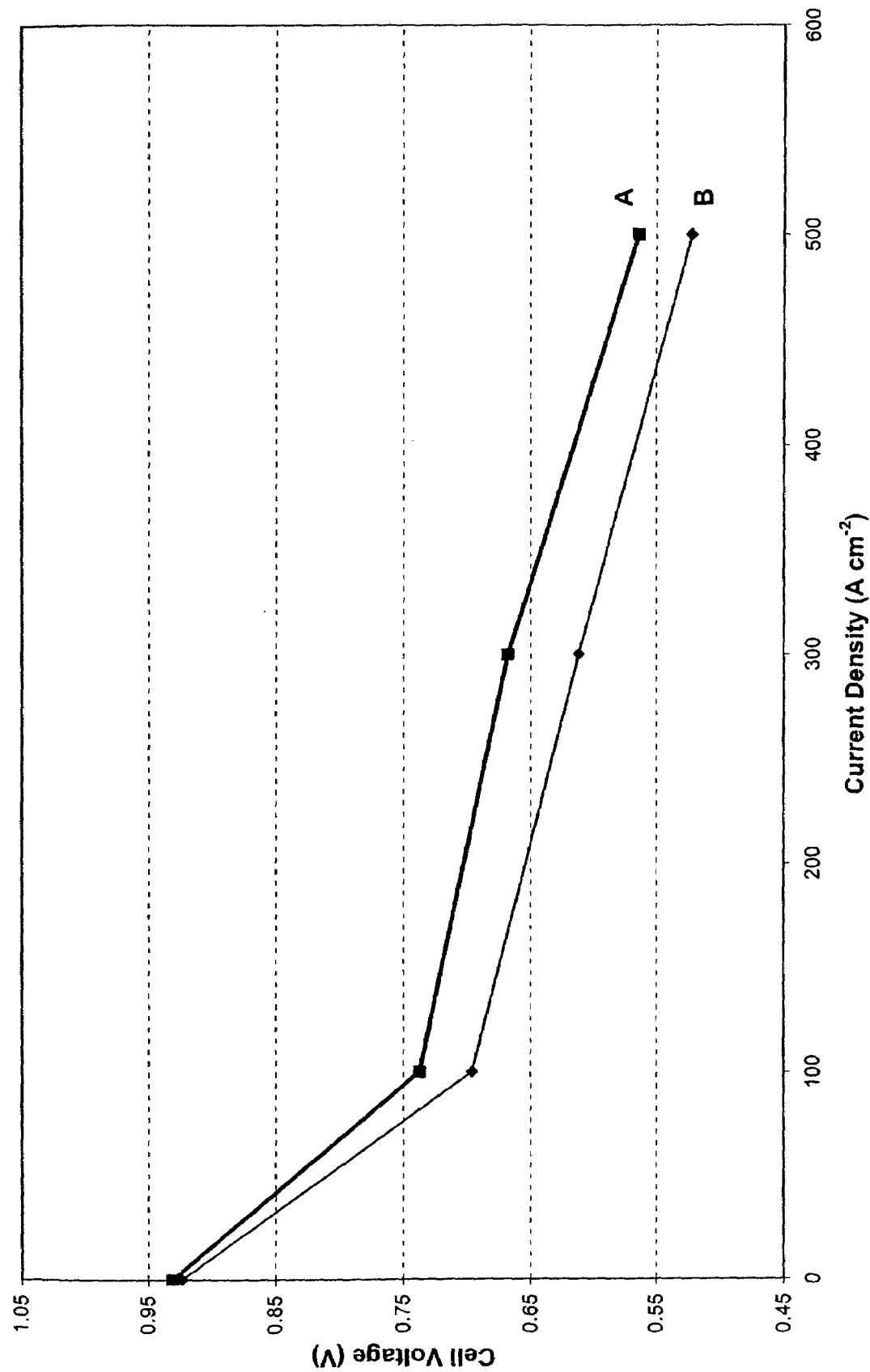
FIG. 1 shows polarization plots of voltage as a function of current density for two fuel cells under specified conditions.

As mentioned above, the present invention provides a water insoluble additive for improving the performance of an ion-exchange membrane. While such membranes have utility over a wide range of applications (including, for example, as ion-exchange filter, fuel cell applications, water electrolysis, and the like), for purpose of illustration such membranes are hereinafter discussed in the context of fuel cell applications.

The water insoluble additive comprises a metal oxide cross-linked matrix having acid groups covalently attached to the matrix through linkers. Suitable metals are, for example, silicon, titanium, zirconium, germanium, aluminum and tin, as well as combinations thereof. In one embodiment, the additive may be a siloxane cross-linked matrix comprising silicon atoms cross-linked by multiple disiloxy bonds (Si—O—Si) and having multiple acid groups (—PO(OH)$_2$) covalently joined to silicon atoms of the matrix via linkers ("L"). The following discussion and examples will refer to such a siloxane (also depicted as "SiO2/-LPO(OH)$_2$") as a representative embodiment of the present additive, although this invention is not intended to be limited in this manner.

The water insoluble matrix may be prepared by, for example, the procedure set forth in the following Reaction Schemes (1) and (2):

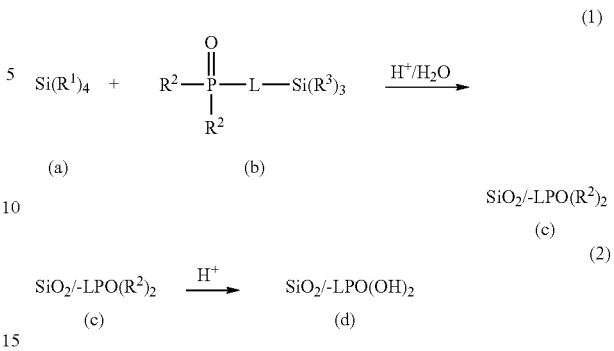

In Reaction Scheme (1), a silane (a) is first reacted with a phosphanato-L-silane (b), water and a catalytic amount of concentrated acid which, upon heating, forms a gel that subsequently solidifies upon further heating to yield cross-linked intermediate (c). In Reaction Scheme (2), acid hydrolysis of the phosphate esters (—PO(R$^2$)$_2$) of cross-linked intermediate (c) yields water insoluble matrix (d) having acid groups (—PO(OH)$_2$) covalently bound to silicon atoms of the matrix via linker L.

As used herein, L is a divalent linker, wherein the linker is alkyl, substituted alkyl, aryl, substituted aryl, arylalkyl or substituted arylalkyl.

Furthermore, R$^1$, R$^2$ and R$^3$ are, at each occurrence, the same or different and independently halogen, alkoxy, aryloxy, substituted aryloxy, arylalkoxy or substituted arylalkoxy. In a more specific embodiment, R$^1$, R$^2$ and R$^3$ are, at each occurrence, the same or different and individually alkoxy. In still a further embodiment, R$^1$, R$^2$ and R$^3$ are at each occurrence ethoxy, in which case silane (a) is tetraethoxysilane and phosphonato-L-silane (b) is diethoxyphosphonato-L-triethoxysilane. In still a further embodiment, L is n-propyl (i.e., —(CH$_2$)$_3$—) and phosphonato-L-silane (b) is diethoxyphosphonato-propyl-triethoxysilane.

The following Reaction Schemes (3) to (6) illustrate the initial reactions that occur in Reaction Scheme (1) to yield cross-linked intermediate (c), SiO$_2$/—LPO(R$^2$)$_2$.

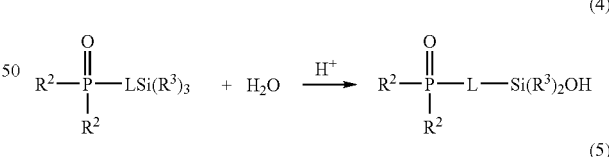
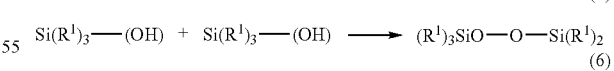
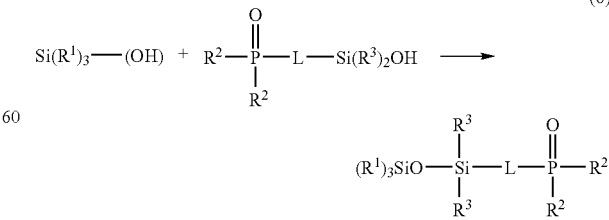

Reaction Schemes (3) and (4) are acid catalyzed hydrolysis reactions, while Reaction Schemes (5) and (6) are condensation and co-condensation reactions, respectively. In such a manner, a cross-linked matrix forms with multiple disiloxy bonds (Si—O—Si). Though not depicted separately above, condensation may also result in phosphonato groups covalently joined to adjacent silicon atoms of the matrix.

While the silane starting material depicted in Reaction Scheme (1) above is shown as a tetra-functional silane, tri-functional silanes may also be utilized. For example, the silane includes, but is not limited to, $SiR(R^1)_3$, where R is an alkyl, substituted alkyl, aryl, substituted aryl, alkylaryl, or substituted alkylaryl. In one embodiment, silane is tetraethoxysilane, which is commercially available from any number of sources and is relatively inexpensive.

As used herein, an "alkyl" group means a straight chain or branched, noncyclic or cyclic, unsaturated or saturated aliphatic hydrocarbon containing from 1 to 10 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Representative saturated cyclic alkyls include cyclopropyl, cyclobutyl, cyclopentyl, cyclohexyl, —$CH_2$cyclopropyl, —$CH_2$cyclobutyl, —$CH_2$cyclopentyl, —$CH_2$cyclohexyl, and the like. Cyclic alkyls, also referred to as "homocyclic rings," and include di- and poly-homocyclic rings such as decalin and adamantyl. Unsaturated alkyls contain at least one double or triple bond between adjacent carbon atoms (referred to as an "alkenyl" or "alkynyl", respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like.

"Aryl" means an aromatic carbocyclic moiety such as phenyl or naphthyl.

"Arylalkyl" means an alkyl having at least one alkyl hydrogen atoms replaced with an aryl moiety, such as benzyl, —$CH_2$(1 or 2-naphthyl), —$(CH_2)_2$phenyl, —$(CH_2)_3$phenyl, —CH(phenyl)$_2$, and the like.

The term "substituted" as used herein means any of the above groups (e.g., alkyl, aryl, or arylalkyl) wherein at least one hydrogen atom is replaced with a substituent. In the case of an oxy substituent ("=O") two hydrogen atoms are replaced. When substituted, "substituents" within the context of this invention include halogen, hydroxy, cyano, nitro, amino, alkylamino, dialkylamino, alkyl, alkoxy, alkylthio, haloalkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl, substituted heterocyclealkyl, —$NR_aR_b$, —$NR_aC(=O)R_b$, —$NR_aC(=O)NR_aR_b$, —$NR_aC(=O)OR_b$ —$NR_aSO_2R_b$, —$OR_a$, —$C(=O)R_a$ —$C(=O)OR_a$, —$C(=O)NR_aR_b$, —$OC(=O)NR_aR_b$, —SH, —$SR_a$, —$SOR_a$, —$S(=O)_2R_a$, —$OS(=O)_2OR_a$, —$S(=O)_2OR_a$, wherein $R_a$ and $R_b$ are the same or different and independently hydrogen, alkyl, haloalkyl, substituted alkyl, aryl, substituted aryl, arylalkyl, substituted arylalkyl, heteroaryl, substituted heteroaryl, heteroarylalkyl, substituted heteroarylalkyl, heterocycle, substituted heterocycle, heterocyclealkyl or substituted heterocyclealkyl.

"Halogen" means fluoro, chloro, bromo and iodo.

The linker (L) is a divalent moiety covalently joining a silicon atom of the matrix to a corresponding acid group. By covalently binding the acid group to the matrix, leaching of acid from the ion-exchange membrane is avoided. Further, since the matrix itself is water-insoluble, the matrix is not capable of being dissolved and thus washed out or leached from the ion exchange matrix.

Suitable linkers in this regard include any divalent moiety that is capable of joining the acid group to a silicon atom via a covalent bond. Representative linkers include an alkanediyl group. As used herein, an "alkanediyl" groups means a divalent alkyl from which two hydrogen atoms are taken from the same carbon atom or from different carbon atoms. Representative alkanediyl groups include $C_{1-4}$alkanediyls such as —$CH_2$— —$CH_2CH_2$—, —$CH_2CH_2CH_2$—, —$CH(CH_3)CH_2$—, and the like, and in a more specific embodiment is a divalent n-propyl group (i.e., —$CH_2CH_2CH_2$—). Other linkers include (but are not limited to) partially fluorinated or perfluorinated alkyl or alkyl ether moieties.

As mentioned above, the additive of this invention finds application in, for example, improving the performance of the ion-exchange membrane of a fuel cell. In such applications, the additive is not water soluble under the operational temperatures typically encountered within a high temperature fuel cell, which are operated at temperatures in excess of 100° C. and typically in the range of from 100 to 150° C. As used herein, the phrase "water insoluble" means that the additive is not soluble in bulk water at room temperature. At higher temperatures, the additive may be slightly soluble in bulk water yet the tendency to be solubilized diminishes once incorporated into an ion-exchange membrane. Without being bound by theory, the water solubility of such an additive may diminish as a result of hydrogen bonding to ionomeric functional groups within the ion-exchange membrane. Furthermore, the pore sizes within the ion-exchange membrane may not permit the additive to leach after growth of the additive in situ within the pore volume of the ion-exchange membrane, even though the additive may be slightly soluble in bulk water at the operating temperatures of the fuel cell.

As the equivalent weight of the additive decreases, the additive becomes a better proton conductor, as well as more soluble in water. The equivalent weight is the weight of the additive in grams divided by the two times the number of moles of acid groups in the additive. acid is divalent so the number of moles of acid groups is multiplied by two to calculate the equivalent weight. The equivalent weight may be, for example, less than 2000 g/mole. In further embodiments, the equivalent weight is less than 1000 g/mole, less than 600 g/mole or even less than 400 g/mole. The lower limit of the equivalent weight is such that the additive remains insoluble (or only slightly soluble as discussed above) in water. For example, the equivalent weight of the additive may be greater than 150 g/mole, or greater than 250 g/mole.

Silicon dioxide, zirconium dioxide and organically modified silicates have been incorporated in Nafion® to improve the water management at high temperature operation of a fuel cell due to the hydrophilic nature of these materials (see, e.g., K. T. Adjemian, et al., *J. Electrochemical Soc.* 149(3) A256-A261, 2002; Q. Deng, et al., *J. Applied Polymer Science* 68, 747-763, 1998; and W. Apichatachutapan, et al., *J. Applied Polymer Science* 62, 417-426, 1996, each of which are herein incorporated by reference in their entirety). During prolonged operation of a fuel cell at high temperatures, the membrane may still become dehydrated even in the presence of these hydrophilic materials. In comparison, the present additive containing acid groups covalently linked to a metal oxide matrix allows proton conduction through the membrane even after prolonged operation of the fuel cell at high temperature.

The water-insoluble additive may be applied to or incorporated within the ion-exchange membrane by any number of suitable techniques (see, e.g., Adjemian, et al., Q. Deng, et al., and Apichatachutapan, et al., as referenced above). The water insoluble matrix may be made prior to incorporation within the ion-exchange membrane, or may be formed in situ. In the case of the former, the additive may be recast with solubilized ionomer or co-extruded. In the case of the latter, cross-linked intermediate (c) in Reaction Scheme (1) above may be incorporated into the ion-exchange membrane, and then hydrolyzed to yield the insoluble matrix having acid groups covalently linked to the silicon atoms of the matrix. In the case of a sulfonated ion-exchange membrane, this same acid hydrolysis step may also be used to generate the sulfonic acid functional group from the corresponding salt form (such as sodium sulfonate).

In the practice of this invention, an ion-exchange membrane is loaded with the water insoluble additive for improving the performance thereof. As used herein, "loading" of the membrane involves the introduction of the additive, either within the membrane on the surface of the membrane (or both) in an amount sufficient to achieve the desired level of improved performance. For example, in the context of a high temperature fuel cell, the ion-exchange membrane is loaded at a level sufficient to provide proton conductance at temperatures in excess of 100° C., and typically in the range of from 100 to 150° C. In a conventional fuel cell, little or no proton conductance is typically observed at temperatures in excess of 100° C.

As mentioned above, an important aspect of this invention is that the water insoluble matrix improves conductivity under low humidity conditions, such as experienced within a fuel cell operating at temperatures in excess of 100° C. In addition, the water insoluble matrix is not washed out or leached during high humidity conditions, such as when the fuel cell is operated at temperatures lower than 100° C. Further, the matrix helps retain water within the membrane via hydrogen bonding interactions with the silicate, thus improving performance at lower temperatures by improving conductivity. Thus, an ion-exchange membrane loaded with the water insoluble matrix of this invention is capable of operating over a wider range of temperatures than existing fuel cell membrane (e.g., over temperatures ranging from 50 to 150° C.).

In still other embodiments, an ion-exchange membrane loaded with the water insoluble matrix is also disclosed, as well as a membrane electrode assembly (MEA), fuel cell and/or fuel cell stack containing the same. Further, fuel cell systems and end-use applications are also within the scope of this invention, including both stationary and mobile applications containing the same.

The following examples are provided by way of illustration, not limitation.

EXAMPLES

Example 1

Preparation of Water Insoluble Matrix

In a vial were placed tetraethoxysilane (0.61 g, 2.9 mmol), diethylphosphonatopropyltriethoxysilane (1.0 g, 2.9 mmol) and a magnetic stir bar. Water (0.12 g, 6.7 mmol) was added with stirring followed by concentrated hydrochloric acid (35 wt %, 0.3 g, 2.9 mmol) resulting in an exotherm reaching 50 to 56° C. The solution was stirred with heating to 80 to 90° C. to allow for the evaporation of ethanol. The final solids were then filtered (0.7 g, 97% hydrolyzed based on weight loss resulting from evaporation of ethanol). The product was further hydrolyzed by refluxing in 25 mL of 1:4 glacial acetic acid:concentrated HCl for 18 hours. Once cooled, the suspension was poured into deionized $H_2O$ and the product filtered off. After soaking in 2M NaCl for 18 hours, the product was titrated with NaOH solution. EW=410 g/mole.

The solid additive from Example 1 may be dispersed by techniques known to one skilled in this field into either (i) a solution of an ion-exchange resin prior to casting a film, or (ii) a hot melt of a base material prior to conversion into an ion-exchange membrane. In the latter embodiment, the solid additive may be dispersed into a hot melt of a partially fluorinated polymer, such as ethylene chloro-trifluoroethylene (ECTFE), followed by irradiation grafting and sulfonation.

Example 2

In situ Preparation of Water Insoluble Matrix Within Ion-Exchange Membrane

In a vial were placed an 11% wt % solution of Flemione® in N,N-dimethylacetamide (94.3 g), diethylphosphonatopropyltriethoxysilane (10.2 g, 29.6 mmol) and tetraethylorthosilicate (10.0 g, 47.5 mmol), and a magnetic stir bar. Water (0.12 g, 6.7 mmol) was added with stirring followed by concentrated hydrochloric acid (35 wt %, 0.3 g, 2.9 mmol). The solution was stirred with heating to a temperature of 120 to 130° C. for 5 minutes, then allowed to cool to room temperature.

A portion of the cooled solution (79.14 g) was diluted with reagent alcohol (156.2 g). This diluted solution was further divided and a portion (78.3 g) poured into a 23 cm×13 cm of ultra-high molecular weight porous polyethylene (Solupor®, supplied by DSM). The membrane was heated on a hot plate until dry (temperature of the membrane=70° C.). The membrane was then removed from the carrier paper.

Hydrolysis of the ester groups was carried out by refluxing the membrane in 250 mL of 1:4 glacial acetic acid:concentrated HCl for 18 hours. Once cooled, the membrane was washed with deionized water until the washings were neutral. A small portion (3.5 cm×6 cm) was soaked in 2 M NaCl for 18 h and titrated with NaOH solution. EW 860 g/mole.

Example 3

In situ Preparation of Water Insoluble Matrix Within Ion-Exchange Membrane

In a vial were placed N,N-dimethylacetamide (33.11 g), diethylphosphonatopropyltriethoxysilane (8.72 g, 25.5 mmol), tetraethylorthosilicate (5.12 g, 24.6 mmol) and a magnetic stir bar. Water (0.062 g, 3.4 mmol) was added with stirring followed by concentrated hydrochloric acid (35 wt %, 0.15 g, 1.5 mmol). The solution was stirred with heating to a temperature of 120 to 130° C. for 5 minutes, then allowed to cool to room temperature.

Two membranes were cast. For membrane A, a portion of the cooled solution (0.5 mL) was diluted with an 18 wt % solution of a sulfonated poly(aryl ether ketone) in N,N-dimethylacetamide (49.5 mL). A film was cast on a sheet of carrier paper (5 mil Melinex® 453) at room temperature using a doctor blade gap of 180 μm, with subsequent drying at 60° C. (20 min) and 140° C. (20 min). The same protocol was followed for membrane B, except that no water soluble matrix solution was added to the solution of sulfonated poly(aryl ether ketone).

Membrane A was removed from the carrier paper prior to hydrolysis. Hydrolysis of the ester groups was carried out by refluxing a section of membrane A (0.20 m×0.50 m) in 2 L of 1:4 glacial acetic acid: concentrated HCl for 18 hours. Once cooled, membrane A was washed with deionized water until the washings were neutral. EW=690 g/mole; 0.83 wt % water insoluble matrix.

Example 4

Use of Sulfonated an Ion-Exchange Membrane Containing Water Insoluble Matrix in a Fuel Cell The membranes prepared as described in Example 3 were each bonded to two catalyzed carbon fiber paper electrodes to form a membrane electrode assembly having a total platinum catalyst loading of 1.25 mg/cm$^2$. The two membrane electrode assemblies were tested in Ballard single cell fuel cells (active area=50 cm$^2$). The following operating conditions were used:

| | |
|---|---|
| Temperature: | 60° C. |
| Relative humidity (RH): | 30% |
| Fuel: | hydrogen |
| Oxidant: | air |
| Reactant inlet pressure: | 3.02 bara for fuel and oxidant |
| Reactant stoichiometries: | 9 fuel and 12 oxidant |

FIG. 1 shows polarization plots of voltage as a function of current density for the two fuel cells under the specified conditions. As is clear from FIG. 1, the membrane incorporating the water insoluble matrix (A) demonstrated significantly improved performance under low humidity conditions compared to the same membrane without the water insoluble matrix (B).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A membrane electrode assembly comprising an ion-exchange membrane which comprises an ionomer and a water insoluble additive, the water insoluble additive comprising a metal oxide cross-linked matrix having phosphoric acid groups covalently attached to the metal atoms through linkers, and wherein the metal is silicon, and the matrix is siloxane matrix.

2. The ion-exchange membrane of claim 1 wherein the linker is a divalent alkyl group.

3. The ion-exchange membrane of claim 2 wherein the divalent alkyl is a divalent straight chain $C_{1-4}$alkyl.

4. The ion-exchange membrane of claim 3 wherein the divalent alkyl is —CH$_2$CH$_2$CH$_2$—.

5. The ion-exchange membrane of claim 1 wherein the water insoluble additive is homogenously dispersed within the ion-exchange membrane.

6. A fuel cell comprising the membrane electrode assembly of claim 1.

7. A fuel cell stack comprising a fuel cell of claim 6.

8. A vehicle comprising the fuel cell stack of claim 7.

9. An electric generator comprising the fuel cell stack of claim 7.

10. A method for making an ion-exchange membrane comprising an ionomer and a water insoluble additive, the method comprising the step of loading the ion-exchange membrane comprising the ionomer with a water insoluble additive, the water insoluble additive comprising a metal oxide cross-linked matrix having acid groups covalently attached to the silicon atoms through linkers, and wherein the metal is silicon, and the matrix is siloxane matrix.

11. The method of claim 10 wherein the step of loading comprises in situ synthesis of the water insoluble additive within the ion-exchange membrane.

12. The method of claim 10 wherein the step of loading comprises casting the ion-exchange membrane with the water insoluble additive.

* * * * *

UNITED STATES PATENT AND TRADEMARK OFFICE
CERTIFICATE OF CORRECTION

PATENT NO. : 7,601,759 B2  Page 1 of 1
APPLICATION NO. : 10/962184
DATED : October 13, 2009
INVENTOR(S) : Sean M. MacKinnon et al.

It is certified that error appears in the above-identified patent and that said Letters Patent is hereby corrected as shown below:

Column 10
Line 32, "having acid groups" should read --having phosphonic acid groups--.

Signed and Sealed this

Twenty-ninth Day of June, 2010

David J. Kappos
*Director of the United States Patent and Trademark Office*